ROBERT T. EASTON,
ARTHUR H. GRIFFITH,
INVENTORS.

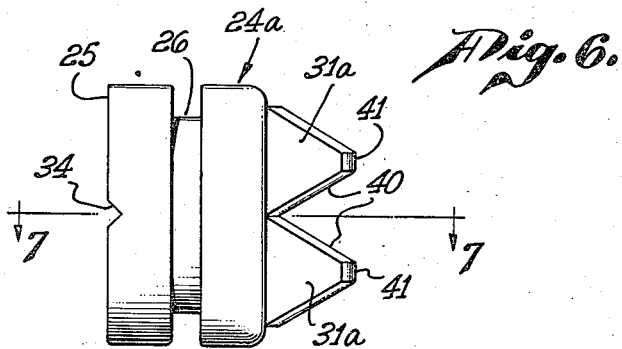
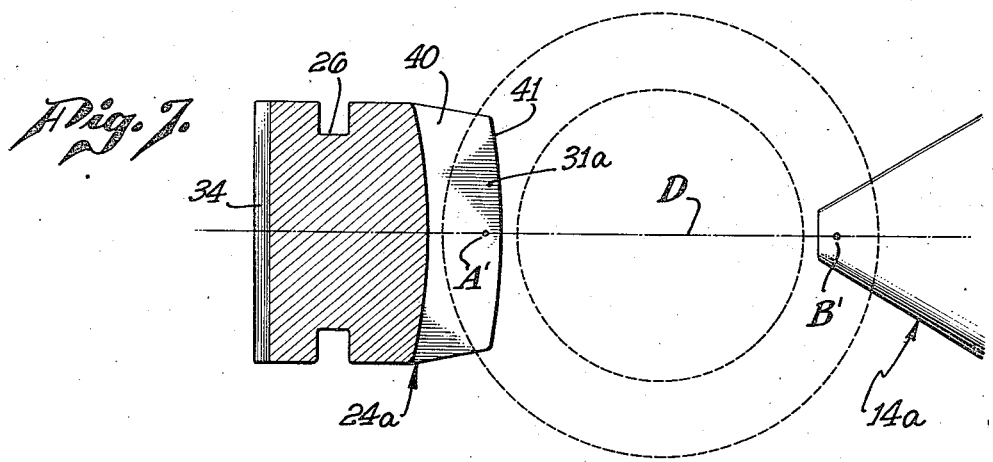

Patented Nov. 5, 1946

2,410,571

UNITED STATES PATENT OFFICE 2,410,571

SCREW THREAD MICROMETER BUTTON

Robert T. Easton and Arthur H. Griffith, Los Angeles, Calif.

Application June 30, 1944, Serial No. 542,970

4 Claims. (Cl. 33—167)

This invention relates to machine tools and instruments generally, and more especially to micrometers or calipers with particular reference to an attachment for conventional micrometers whereby they are adapted for measuring screw threads.

An object of the invention is to provide a simple, practical, and inexpensive screw thread attachment for micrometers as described.

Another object of the invention is to provide an adapter for conventional micrometers or calipers capable of measuring screw threads.

A further object of the invention is to provide a micrometer adapter of the character described capable of being used in connection with micrometers for either male or female threads, that is to say, inside or outside threads.

An additional object is to provide attachment devices for the spindle and anvil of a micrometer and caliper which may be quickly attached thereto and readily removed therefrom, such that a single micrometer or caliper instrument is necessary for ordinary measurements and for measuring screw threads.

An additional object of the invention is to provide novel attachment means for adapting a conventional micrometer to a screw thread micrometer wherein the attachment devices may be firmly and accurately positioned onto the micrometer spindle and anvil, however, readily detachable therefrom when desired or necessary.

An additional object is to provide in screw thread adapter devices for a micrometer as described of novel means for removing from the facing surfaces of the measuring parts of particles of dust, dirt or other foreign matter which would otherwise affect the accuracy of the instrument.

A still further object in a modified form is to provide a button having an arcuate open contact tip V shaped in cross section adapted to provide an accurate feel when applying the micrometer. This feature may be embodied in a detachable button, but such a tip permanently mounted on or as a part of the anvil or spindle would be equivalent.

Other objects and advantages will appear and be brought out more fully in the following specification considered with reference to the accompanying drawings throughout which like parts are designated by like numerals.

In the drawings:

Figure 6 is a view illustrating a modified form of attachment element.

Figure 7 is a sectional view taken along the line 7—7 of Figure 6, also illustrating the same in use.

Figure 1:
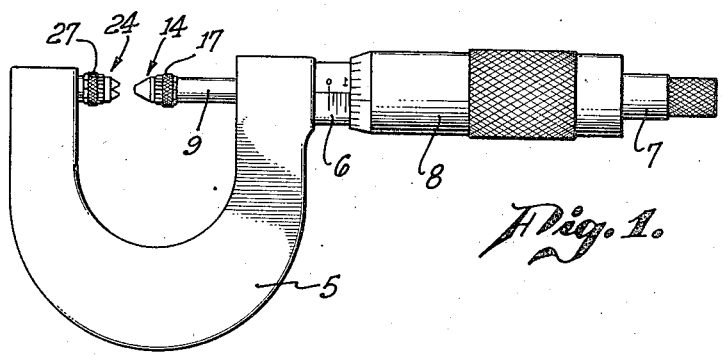
Figure 1 is a side view of a micrometer showing our invention.

Measuring instruments in the machine tool field are well known and among those very widely used are micrometers and calipers, numerous variations of which in form, size, and construction are common, however, the standard micrometer or micrometer caliper, as it is sometimes referred to, has certain features which are common to most of the varieties thereof, and such an instrument comprises a somewhat C-shaped frame, at one end of which is formed a threaded bore for a spindle member, which by turning thereof in the threaded bore, advances the spindle toward and away from a member on the opposite portion of the C-shaped frame comprising an abutment or anvil, between which and the spindle a machine part or work piece is placed for measuring the outer dimensions thereof. In such instruments the spindle and anvil are usually cylindrical in outline and each has a flat circular face, which faces may be brought together, and if the instrument is accurately made, will provide a zero reading on a scale formed by suitable registration of engraved marks on the frame and spindle members respectively.

Heretofore such instruments have been provided for measuring screw threads, which measurements are usually taken of the pitch diameters of the threaded sections. The pitch diameters are the diameters taken across the threaded part at a point one-half the depth of the V of the thread formation to a similar diametrical point on the opposite side. Inasmuch as commercial thread formations do not have a sharp V point either at the outside of the thread or at the bottom of the groove thereof, and the amount of the truncation of the configuration is not uniform or related to the pitch diameter a conventional micrometer can not be used as a measurement of the threads. Devices have heretofore been used consisting of rods or wires placed in the thread grooves, and measurements made of the outer distances therebetween, and separate sets of such wires or rods have been necessary for each thread size, since rods of a given size would enter by greater or less amounts in threads of different pitch diameters and different numbers of threads to the inch.

The present invention contemplates overcoming the objections to devices of the type mentioned, and incorporates in a single set of detachable elements which may be applied to a micrometer or micrometer caliper of conventional type, a set of measuring tips or buttons requiring a maximum of six pairs to adapt a micrometer for all of the threads having a pitch range from four to sixty-four threads per inch. Also the tips or buttons are adapted for attachment to the fixed and movable portions of an inside micrometer, and thus the same set of tips or buttons can be used for either male or female threads.

Referring more particularly to the drawings, we show a micrometer caliper having a generally C-shaped frame portion 5 having a shank portion 6 extending substantially at right angles from one of the end portions of the C, which shank portion 6 is suitably provided with a threaded bore through which extends a spindle 7, the spindle having tubular portion 8 which extends partially over the shank 6 by which the spindle is rotated. Spindle 7 has a cylindrical end portion 9 providing an accurately ground circular face 10. The other end of the C is provided with an anvil 11 having a cylindrical end portion 12 usually of the same diameter as that of spindle end portion 9, and further provided with a similar ground contact face 13.

Figure 2:
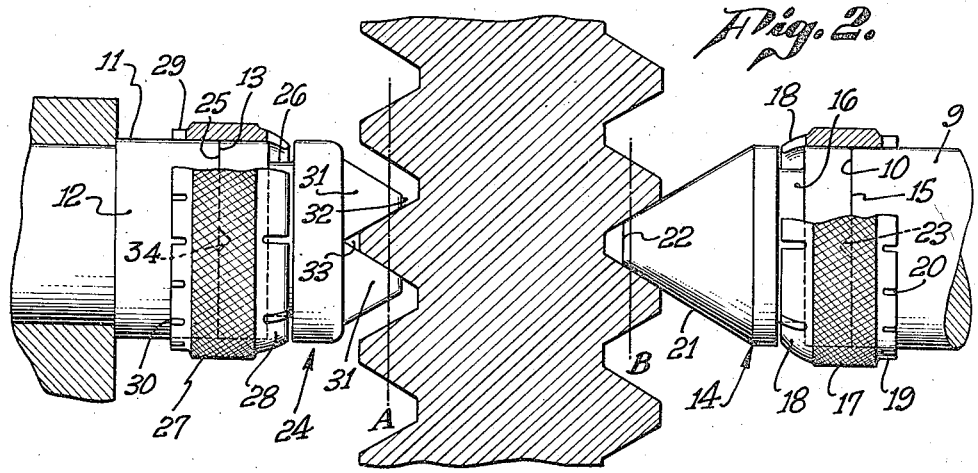
Figure 2 is an enlarged view partly in section showing the inventive features also seen in Figure 1.
Figure 4:
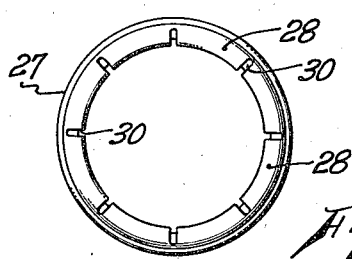
Figure 4 is an end view of the securing ferrule.
Figure 3:
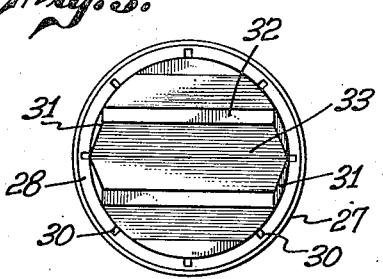
Figure 3 is an end view of one of the attachment elements.

We show a tip or button element 14 cylindrical in outline and of substantially the same diameter as spindle end portion 9 and anvil 11, and having a flat face 15 and an annular groove 16. A ferrule 17, the edges of which are thinner than the mid-portion and which may be tapered, if preferred, is provided having claws 18, which interfit in groove 16, and an annular portion 19 slotted at 20 for resilient or friction engagement on spindle end portion 9, as shown in Figure 2. Button 14 preferably has a frusto-conical tip 21 which is truncated at 22, as shown, for interfitting engagement in the groove of a male screw thread, the truncated portion 22 being so formed that the end of the tip does not reach the bottom of the thread groove which would result in inaccuracy in reading, inasmuch as the bottom of the thread grooves are not uniformly formed. The button 14 may be V shaped in cross section without being frusto-conical.

Button 14 is held with face 15 against face 10 of the spindle by the holding action of claws 18 in groove 16, and is rotatable with respect to the spindle. A transverse groove 23 is formed in face 15 so that when the button is applied to end 9 of the spindle, the button may be rotated, and any dust, dirt or other foreign matter on face 10 will be scraped into groove 23 and will not affect the accuracy of the instrument.

A complementary tip or button element 24 is provided for anvil 11, the tip being provided with a circular face 25 which is held against face 13 of the anvil and has an annular groove 26 for holding by ferrule 27 which has claws 28 interfitting in groove 26, and an annular portion 29 slotted at 30 for resilient or friction engagement on anvil 11. The edges of the ferrule 27 may have the same general shape and configuration as the edges of the ferrule 17. Member 24 has a pair of V-shaped tips 31 truncated at 32 and forming a V groove 33 extending across the member on a diameter thereof, so as to be longitudinally aligned with tip 21, it being understood that tips 31 interfit in thread grooves of a screw and groove 33 fits over a screw thread diametrically opposite to the groove of the screw into which the tip 21 fits. Tip 24 has a groove 34 in face 25 similar to groove 23, and tip 24 is rotatable on anvil 11 in a manner similar to tip 21.

Figure 5:
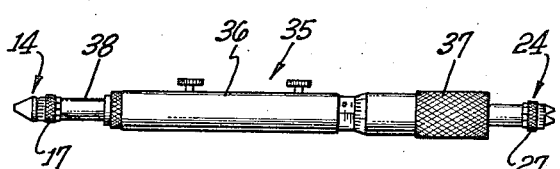
Figure 5 is a side view of an inside micrometer showing the thread testing attachments.

In Figure 5 we show our invention applied to an inside micrometer caliper used for measuring female threads and in this figure the micrometer is indicated at 35 and comprises a frame or shank 36 having a threaded bore for a spindle 37 and further provided with an anvil 38 secured to or integral with the shank 36. The thread gage tips or buttons 14 and 24 shown in Figures 1 to 4 are disclosed as being secured to spindle 37 and anvil 38 in a manner substantially similar to the showing of Figures 1 to 4.

Figures 6 and 7 illustrate a modified form of attachment element and the manner of use by which error is avoided. In these figures we show button elements 14a and 24a, similar to buttons 14 and 24 with respect to the mode of attachment to the spindle and anvil respectively, the modified features residing in the tips 31a of the button 24a. These tips are substantially V shaped and truncated, however having contact surfaces 40, which are convexed to provide high points at the center line along a plane transverse to the extent of the groove. The facing edges 41 are similar to those of button 24, however edges 41 are also curved in a convex arc. The form of this button resembles the segment of a V pulley. The dotted circles in Figure 7 indicate the root and outer diameters of a screw thread, and buttons 14a and 24a are shown in connection therewith to illustrate the manner of obtaining a correct reading. Points A' and points B' are indicated as straddling a diametrical line D of the screw and respectively on opposite sides of the center line of the buttons 14a and 24a, which points make contact with the sides of the screw thread at the pitch diameter thereof, when a correct reading is obtained. In use, the micrometer of these figures is passed across a screw thread and the spindle turned until a feeling contact is made. This contact will occur at the points A' and the points B' and no contact will occur at any other pair of points on the buttons respectively. The distance measured will be the distance between one point identified as the theoretical intersection of a line drawn between points A' and the center line of the buttons 14a and 24a and a second point determined by the theoretical intersection of a line drawn between the points B' and the same center line of the buttons. This will be the pitch diameter of the thread. The curvature illustrated in Figures 6 and 7 is exaggerated for purposes of clarity. The depth of the chord in actual practice will usually range from .005 to .010 of an inch, although more or less can be employed.

Inasmuch as screw threads are spiral or helical, the reason for the convex curvature of surfaces 40 will be apparent. The surface of the thread is inclined to the screw axis, and a tangent to the pitch circle or helix will also be inclined. A flat surfaced tip could not be passed as effectively across a thread groove without contacting a "high" spot on the groove wall offset from point A', and an error in reading the correct pitch diameter would result.

Although we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent devices.

Having thus described our invention, what we claim as new and desire to secure by Letters Patent is:

1. In a micrometer caliper having an anvil and spindle, a pair of thread gage buttons adapted to be detachably secured to said anvil and spindle respectively, said anvil, said spindle and buttons having abutting face portions, said button face portions having a transverse groove extending through the center line to facilitate forming a close fit with said anvil and spindle faces.

2. In a micrometer caliper incorporating anvil and spindle elements, a pair of thread gage buttons and means for detachably securing said buttons to said anvil and said spindle elements respectively, each comprising a sleeve having edges on each end incorporating longitudinal slots, one of said edges being pressed frictionally against the respective micrometer element, said button having an annular external groove and the other of said edges being pressed into frictional contact throughout an edge of said groove.

3. In a micrometer caliper incorporating anvil and spindle elements having flat transverse surfaces, a pair of thread gage buttons having flat transverse surfaces adapted to abut and rotate relative to the respective surfaces of the micrometer elements and means for detachably securing said buttons to said anvil and said spindle elements respectively, each comprising a sleeve having edges on each end reduced in thickness incorporating longitudinal slots, one of said edges being pressed frictionally against the respective micrometer element, said button having an annular external groove and the other of said edges being pressed into frictional contact throughout an edge of said groove.

4. In a micrometer caliper incorporating anvil and spindle elements having flat transverse surfaces, a pair of thread gage buttons having flat transverse surfaces adapted to abut and rotate relative to the respective surfaces of the micrometer elements and means for detachably securing said buttons to said anvil and said spindle elements respectively, each comprising a sleeve having tapered edges incorporating longitudinal slots, one of said edges being pressed frictionally against the respective micrometer element, said button having an annular external groove, the other of said edges being pressed into frictional contact throughout an edge of said groove, the flat surface of each said button and the adjacent flat surface of the respective micrometer element being partially separated by a transverse diametric cleaning groove.

ROBERT T. EASTON.
ARTHUR H. GRIFFITH.